United States Patent [19]

Kuroda et al.

[11] Patent Number: 5,078,973
[45] Date of Patent: Jan. 7, 1992

[54] APPARATUS FOR TREATING FLUE GAS

[75] Inventors: Hiroshi Kuroda; Osamu Kanada; Tomihisa Ishikawa; Toshimichi Wada; Yoshiro Inatsune; Hiromi Kamogawa, all of Kure, Japan

[73] Assignee: Babcoco-Hitachi Kabushiki Kaisha, Tokyo, Japan

[21] Appl. No.: 372,118

[22] Filed: Jun. 28, 1989

Related U.S. Application Data

[63] Continuation of Ser. No. 823,532, Jan. 29, 1986, abandoned.

[30] Foreign Application Priority Data

| Jan. 30, 1985 | [JP] | Japan | 60-14442 |
| Feb. 12, 1985 | [JP] | Japan | 60-18136 |
| Feb. 13, 1985 | [JP] | Japan | 60-17696 |

[51] Int. Cl.$^5$ .............................. B01D 5/10
[52] U.S. Cl. ........................ 422/171; 422/108; 422/109; 422/111; 422/170; 422/172; 422/182; 422/183; 423/235; 423/239
[58] Field of Search ............... 422/108, 109, 111, 170, 422/171, 172, 182, 183; 423/235, 239

[56] References Cited

U.S. PATENT DOCUMENTS

| 4,054,640 | 10/1977 | Iwata et al. | 423/239 A |
| 4,160,009 | 7/1979 | Hamabe | 422/183 |
| 4,302,205 | 11/1981 | Muraki et al. | 423/235 |
| 4,305,910 | 12/1981 | Kudo et al. | 422/177 |
| 4,403,473 | 9/1983 | Gladden | 422/183 |

FOREIGN PATENT DOCUMENTS

| 0148741 | 8/1984 | European Pat. Off. |
| 2290242 | 6/1976 | France |
| 2295243 | 7/1976 | France |
| 51-151259 | 12/1976 | Japan |
| 53-142972 | 12/1978 | Japan |
| 0020955 | 2/1979 | Japan | 422/115 |
| 55-70328 | 5/1980 | Japan |
| 55-124531 | 9/1980 | Japan |
| 56-37035 | 4/1981 | Japan |
| 58-43320 | 3/1983 | Japan |

Primary Examiner—Robert J. Warden
Assistant Examiner—Timothy M. McMahon
Attorney, Agent, or Firm—Antonelli, Terry, Stout & Kraus

[57] ABSTRACT

An apparatus for treating a flue gas provided with a heater and an apparatus for removing NOx on the downstream side of an apparatus for removing SOx, where a heat exchanger for heat exchanging a treated gas from the apparatus for removing NOx with conbustion air is provided on the downstream side of the apparatus for removing NOx, whereby the waste heat of the treated gas can be efficiently utilized and the heat required for heating the flue gas can be reduced.

6 Claims, 7 Drawing Sheets

APPARATUS FOR TREATING FLUE GAS

This application is a continuation of application Ser. No. 06/823,532, filed Jan. 29, 1986 now abandoned.

BACKGROUND OF THE INVENTION

This invention relates to an apparatus for treating a flue gas to remove nitrogen oxides and sulfur oxides from a combustion flue gas discharged from boilers, industrial furnaces, gas turbines, and combustion facilities for treating wastes. Nitrogen oxides will be hereinafter referred to merely as NOx, and sulfur oxides merely as SOx.

Recently in Japan, fuel species for combustion is changing from heavy oil to coal due to tight supply of heavy oil to reduce the petroleum dependency, and coal-fired boilers of large capacity for power plants are now under construction for utility companies. However, coal as fuel has poor combustibility as compared with petroleum fuel, and NOx, SOx and uncombusted matters are liable to be emitted into the flue gas from coal-fired boilers. To reduce emission of NOx, slow coal combustion has been carried out by dividing the combustion flame into sections, or recycling the flue gas, conducting the combustion at two stages or removing NOx within the furnace before emission to the outside.

In the coal-fired power plants, the boilers are operated not always under a full load, but variable load of 75%, 50% or 25% full foad, or the boiler operation is discontinued, for example, according to the so called Daily Start-Stop schedule (which will be hereinafter referred to merely as "DSS schedule") or the so called Weekly Start-Stop schedule (which will be hereinafter referred to merely as "WSS schedule"). That is, the coal-fired power plants operatable under such intermediate load have been in keen demand.

On the other hand, a combination of a gas turbine of good startup characteristics with a waste heat recovery boiler, i.e. the so called combined plant, is now going to be contructed to meet the power generation under the intermediate load besides the coal-fired boilers, and is to be operated only in the daytime from Monday through to Friday according to the DSS or WSS schedule to meet the large power demand, and the operation is stopped at night or on Saturday or Sunday or holidays.

However, according to more stringent restriction of the NOx or SOx concentration of flue gas, power plants operable under the intermediate load, which are provided not only with the conventional combustion improvement, but also with an apparatus for treating the flue gas such as an apparatus for removing NOx by catalytic reduction by dry process, i.e. an apparatus for removing NOx with $NH_3$ as a reducing agent in the presence of a catalyst, or an apparatus for removing SOx have been now constructed in increasing numbers.

Figure 14:
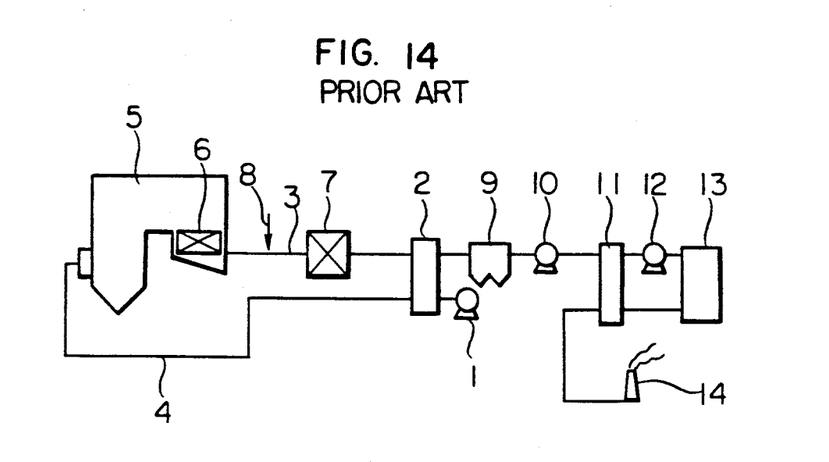
FIGS. 14 and 15 are schematic flowsheets of apparatuses for treating a flue gas according to the prior art, respectively.
Figure 15:
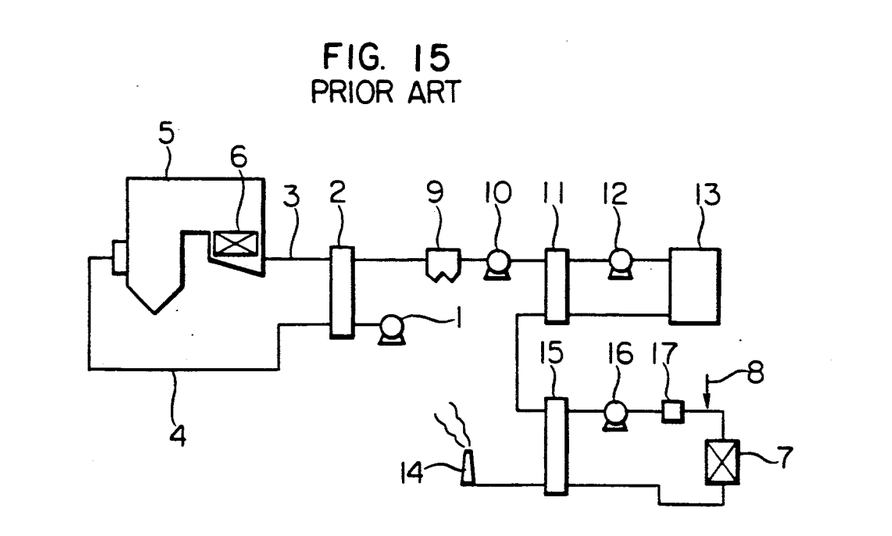

FIGS. 14 and 15 show schematic flowsheets of apparatuses for treating a flue gas from a boiler based on a typical equilibrium draft system, provided with an apparatus for removing SOx and an apparatus for removing NOx according to the prior art.

In FIG. 14, an apparatus for removing NOx is provided on the downstream side of an economizer, and thus this system is called "After-Economizer System".

In FIG. 15, an apparatus for removing NOx is provided on the downstream side of an apparatus for removing SOx, and thus this system is called "After-DeNOx system".

In FIG. 14, the air pressurized by a forced draft fan 1 is heated through heat exchange with the flue gas passing through a flue gas duct 3 at an air heater 2, and is used as a combustion air in a boiler 5 through an air duct 4. The combustion flue gas from the boiler 5 is led to an apparatus for removing NOx through an economizer 6, and on the way ammonia ($NH_3$) as a NOx-reducing gas is injected into the flue gas through an injection pipe 8. The waste heat of flue gas treated in the apparatus for removing NOx through the flue gas duct 3 is subjected to heat recovery in the air heater 2 and then to dust removal in a dust collector 9. Then, the flue gas is led to an apparatus for removing SOx 13 through an induced draft fan 10, a gas-gas heater 11, and a fan 12 for the apparatus for removing SOx. In the apparatus for removing SOx, the flue gas must be treated at a lower temperature (usually the treatment is carried out by wet process or by semi-wet process). When the treated flue gas after the removal of SOx in the apparatus 13 is discharged as such from a stack 14, there is a problem of white plume. Thus, the gas-gas heater 11 is provided to reheat the treated gas with the untreated flue gas. The gas-gas heater 11 is to lower the temperature of the flue gas to the apparatus for removing SOx 13 by wet process to reduce the evaporation of water during the water cooling.

According to the said After-Economizer System, the apparatus for removing NOx 7 is provided in a most suitable temperature zone for removing NOx at the outlet of boiler 5 (economizer 6), and also the apparatus for removing SOx 13 is provided in the most suitable temperature zone for removing SOx.

On the other hand, according to the After-DeNOx system, the apparatus for removing SOx 13 is provided on the upstream side of the apparatus for removing NOx 7 to remove SOx at first, and then NOx, as shown in FIG. 15. That is, the flue gas from the fan 12 for the apparatus for removing SOx 13 is subjected to SOx removal in the apparatus 13, and led to a heater 17 through a gas-gas heater 11, a gas-gas heater 15 and a fan 16 for the apparatus for removing NOx, and in the heater 17 the treated gas after the SOx removal is heated to the most suitable temperature range of 300° to 400° C for removing NOx. Then, the treated flue gas is mixed with NH from the $NH_3$ injection pipe 8, and subjected to NOx removal in the apparatus 7, and discharged to the atmosphere from the stack 14 through the gas-gas heater 15.

However, both of these conventional After-Economizer System and After-DeNOx system have the following problems. That is, in the apparatus for treating a flue gas according to the After-Economizer System, the NOx removal is carried out before the SOx removal, and thus $NH_3$ leaked from the apparatus for removing NOx 7 tends to be combined with $SO_3$ present in the flue gas, and the resulting ammonium bisulfate deposits on the elements of the air heater 2 to clog the clearances between the elements. Furthermore, the dusts recovered in the dust collector 9 tend to be contaminated with the leaked $NH_3$ to bring about various problems. Also, the waste water from the apparatus for removing SOx also tends to be contaminated with the leaked $NH_3$ to increase the N content of the waste water to cause the so-called enriched nourishment phenomenon.

In the After-Economizer System, the combustion air from the air duct 4 leaks into the flue gas in the air heater 2 (usually the leakage is estimated to be about 7%), and, thus, the capacity of the apparatus for treating a flue gas is increased, and consequently the capacity of the drafting system, including the forced draft fan 1, forced draft fan 10, fan 12 for the apparatus for removing SOx, etc., is also increased. This leads to an increased power consumption.

To solve these problems, various types of an apparatus for treating a flue gas have been contemplated. For example, the dust collector 9 is provided on the upstream side of the apparatus for removing NOx 7, where the problem of contamination of dusts with $NH_3$ can be solved, but the problem of contamination of the waste water from the apparatus for removing SOx 13 with $NH_3$ is not solved. Thus, the After-DeNOx system where the apparatus for removing NOx 7 is provided on the most downstream side in the apparatus for treating a flue gas to solve the problems of leaked $NH_3$, as shown in FIG. 15, is employed.

According to the After-Economizer System, the dusts recovered in the dust collector 9 are not contaminated with the leaked $NH_3$ and thus have a high utility in application to cement materials, etc. or have no smell of $NH_3$ or contamination of rain water, etc. when discarded.

Furthermore, the waste water from the apparatus for removing SOx is not contaminated with the leaked $NH_3$ and thus no denitrization treatment is required. The flue gas to the apparatus for removing NOx 7 contains no sulfur components and thus the life of an NOx-removing catalyst can be maintained for a longer period of time. However, the After-DeNOx system has a problem of heat utilization, i.e. large heat loss on the whole, because in the After-DeNox system shown in FIG. 15 the gas temperature at the outlet of the fan 12 for the apparatus for removing SOx 13, i.e. at the inlet of the apparatus 13, is 140° to 150° C., whereas the treated gas at the outlet of the apparatus 13 is cooled to 40° to 50° C., and thus the flue gas must be heated to a suitable temperature of 300° to 400° C. for the NOx removal through the heater 17 before the flue gas is led to the apparatus for removing NOx 7. Thus, it is a key of the After-DeNOx system how effectively the heat recovery should be carried out between the SOx removal and the NOx removal. To this end, heat recovery has been so far carried out with two gas-gas heaters 11 and 15, among which the gas-gas heater 15 has a larger influence upon the operating cost. The gas-gas heater 15 is to heat exchange the flue gas at the inlet of heater 17 with the treated gas at the outlet of the apparatus for removing NOx, and the heating duty of the heater 17, i.e. the amount of fuel used, depends on the heat exchange efficiency of the gas-gas heater 15. The higher the heat exchange efficiency, the higher the flue gas temperature at the inlet of heater 17 and the smaller the temperature difference from the treated gas at the inlet of the apparatus for removing NOx 7. That is, the fuel to the heater 17 can be saved, but the heat exchange efficiency naturally has a limit. Even in case of using a gas-gas heater 15 of high heat exchange efficiency, the temperature increase of flue gas to the heater 17 is only by 30° to 50° C. The heater 17 is provided on the downstream side of the apparatus for removing SOx 13, and thus only fuel of low sulfur content must be used. In other words, the fuel cost will be higher, and even the temperature increase by 30° to 50° C. means a large increase in operating cost when applied to a large volume of flue gas from boilers, etc. from commercial power plants. That is, how to recover the heat from the combustion of such high cost fuel to decrease the fuel cost in the entire plant has been a problem to be solved.

SUMMARY OF THE INVENTION

An object of the present invention is to overcome the disadvantages of the prior art and provide an apparatus for treating a flue gas where, when an apparatus for removing NOx is provided on the downstream side of an apparatus for removing SOx, the loss of heat required for heating the flue gas can be made smaller, without any increase in the capacity of the apparatus for treating a flue gas due to air leakage in an air heater.

The present invention is based on finding of effective utilization of the treated gas at the outlet of an apparatus for removing NOx. The treated gas with a well recoverable heat has been so far discarded. That is, in the present invention the heat of the treated gas from the apparatus for removing NOx provided on the downstream side of an apparatus for removing SOx is to be recovered by a combustion air in an air heater. In the present invention, the heat required for heating the flue gas can be saved even in an apparatus for treating a flue gas based on the After-DeNOx system to attain an energy saving, and the heat discharged from the stack can be minimized to effectively utilize the waste heat.

The present invention will be described in detail below by way of embodiments, referring to the accompanying drawings.

PREFERRED EMBODIMENTS OF THE INVENTION

Figure 1:
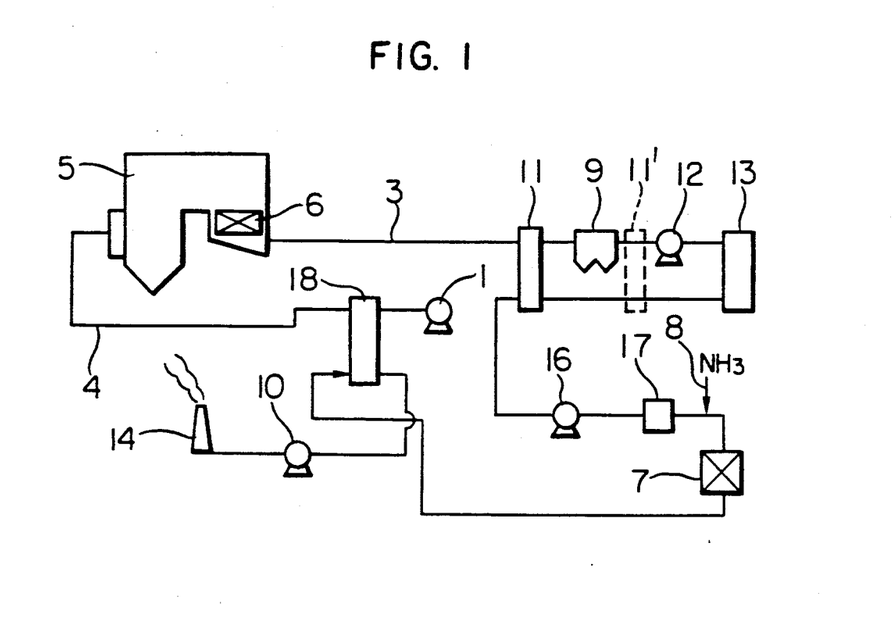
FIG. 1 is a schematic flowsheet of an apparatus for treating a flue gas according to one embodiment of the present invention.

FIG. 1 is a schematic flowsheet of an apparatus for treating a flue gas according to one embodiment of the present invention, where combustion air is pressurized by a forced draft fan 1, heated in an air heater 18 by the treated gas from an apparatus for removing NOx and supplied to a boiler through an air duct 4 as combustion air. The combustion flue gas from the boiler 5 is subjected to heat recovery in an economizer 6 and a gas-gas heater 11 by the treated gas from an apparatus for removing SOx 13 through a flue gas duct 3, led to a dust collector 9, then pressurized by a fan 12 to the apparatus for removing SOx 13, and then led to the apparatus 13.

In the apparatus 13, the flue gas is usually treated by wet process, or by semi-wet process, and thus the temperature of flue gas is lowered. The treated flue gas is heated in the gas-gas heater 11, pressurized by a fan 16 to an apparatus for removing NOx, led to a heater 17, heated therein to an NOx-removable gas temperature (usually about 350° C., a gas temperature corresponding to that at the outlet of the economizer 6 provided at the outlet of the boiler 5), and then subjected to NOx removal in the apparatus for removing NOx 7. The heater 17 usually may be such a type as to heat the treated flue gas by direct mixing of combustion flue gas through a burner, etc. After the heating, an ammonia gas is injected to the flue gas from an NH3 injection pipe 8 and the flue gas is subjected to NOx removal in the apparatus 7, and then to heat recovery in the air heater 18 by the combustion air to the boiler 5, and discharged to the atmosphere from a stack 14 after the pressurization by an induced draft fan 10.

Figure 2:
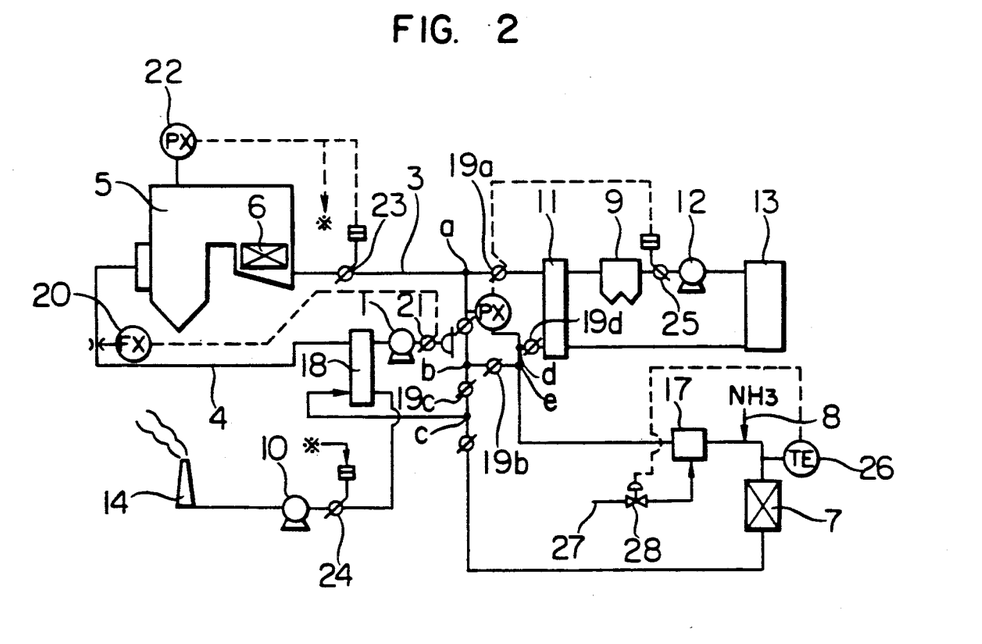
FIG. 2 is a detailed flowsheet of an apparatus for treating a flue gas according to the said embodiment of the present invention.

FIG. 2 is a flowsheet showing the embodiment shown in the apparatus for treating a flue gas in FIG. 1, where bypass lines are provided in the apparatus for removing SOx 13 and the apparatus for removing NOx 7, and furthermore control lines are provided.

In FIG. 2, a SOx-removal bypass line (a - b - e - c) are provided at the apparatus for removing SOx 13, a NOx-removal bypass line (a - d - e - b - c) at the apparatus for removing NOx 7, and then switch valves 19a, 19b, 19c and 19d are provided. With the SOx-removal bypass line (a - b - e - c), the NOx-removal bypass line (a - d - e - b - c), and the switch valves, operation of the individual apparatuses 13 and 7 can be selected. In the drafting system, operation of the forced draft fan 1 can be carried out by controlling a damper 21 by a combustion air flow rate meter (FX) 20 as in the prior art. Operation of the induced draft fan 10 can be carried out by controlling dampers 23 and 24 by a boiler burnace pressure meter (PX) 22. The fan 12 to the apparatus for removing SOx is operated by controlling a damper 25 by a pressure difference between the inlet and the outlet of the apparatus 13, as in the prior art. Thus, the drafting system can be basically operated according to the same control system as in the prior art.

The heater 17 can be operated by detecting the gas temperature at the inlet of the apparatus for removing NOx 7 by a gas temperature detector (TE) 26 and controlling a valve 28 in the fuel line 27 to the heater 17 so that the detected temperature may be the most suitable temperature for NOx removal. The set temperature value may be made equal to the gas temperature at the outlet of the boiler, or may be a constant gas temperature, irrespective of the boiler load. In brief, the heat can be ultimately recovered in the air heater 18 on the boiler side, and thus only how to take a heat balance on the boiler side is important.

In the apparatuses shown in FIGS. 1 and 2, the following effects can be obtained. The first effect is a minimum heat loss when the boiler 5 and the apparatus for treating a flue gas on the whole are taken into account. That is, when the heat ultimately discharged from the stack 14 is taken into account in this system, the heat supplied by the heater 17 on the upstream side of the apparatus for removing NOx 7 is all recovered by the air heater 18 on the boiler side, making no substantial heat loss.

The second effect is such that there is no increase in the capacity of an apparatus for treating a flue gas as in the prior art, because the air leaking in the flue gas at the air heater 18 is only discharged from the stack 14, because the flue gas is heat exchanged in the air heater 18 on the boiler side after the duct collector 9, the apparatus for removing SOx 13 and the apparatus for removing NOx 7. This effect is remarkable, because, when, for example, 7% of the air leaks into the flue gas in the air heater 18, the power of the induced draft fan 10, the fan 16 for the apparatus for removing NOx, etc. is about 7% increased, and by 7% more catalyst must be filled to maintain the same SV value in the apparatus for removing NOx 7, whereas in the present invention, there is no such increase in the capacity.

The third effect is such that three heat exchangers, i.e. air heater 2, gas-gas heater 11 and gas-gas heater 15, are required in the whole plant shown in FIG. 15 of the prior art, whereas in the present invention, only two heat exchangers, i.e. gas-gas heater 11 and air heater 18 are required. Furthermore, the gas-gas heater 11 and the gas-gas heater 15 of the prior art have a small temperature difference between the high temperature gas and the low temperature gas, as compared with the air heater 18 of the present invention, and thus must have a larger heat transmission area to increase the heat exchange capacity. This is the economical problem of the prior art. On the other hand, the air heater 18 of the present invention can have a larger temperature difference, that is, can perform heat exchange in a smaller heat transmission area. Thus, the present invention is economical. As is apparent from the foregoing, the present invention can solve the problems of the prior art, i.e. an increase in the operating cost due to the additional heating of flue gas when the apparatus for removing NOx 7 is provided on the downstream side of the apparatus for removing SOx 13, an increase in the capacity of an apparatus for treating a flue gas, due to the leakage of air in the air heater 18, etc. Furthermore, the effect of reducing the number of heat exchangers can be obtained. Thus, the remarkable effects can be obtained in the present invention.

By providing a gas-gas heater 11' on the downstream side of the dust collector 9 in FIG. 1, low temperature corrosion of the gas-gas heater 11 and the dust collector 9 can be prevented. The dust collector 9 may be in a high temperature system by providing the dust collector on the upstream side of a gas-gas heater 11.

Figure 3:
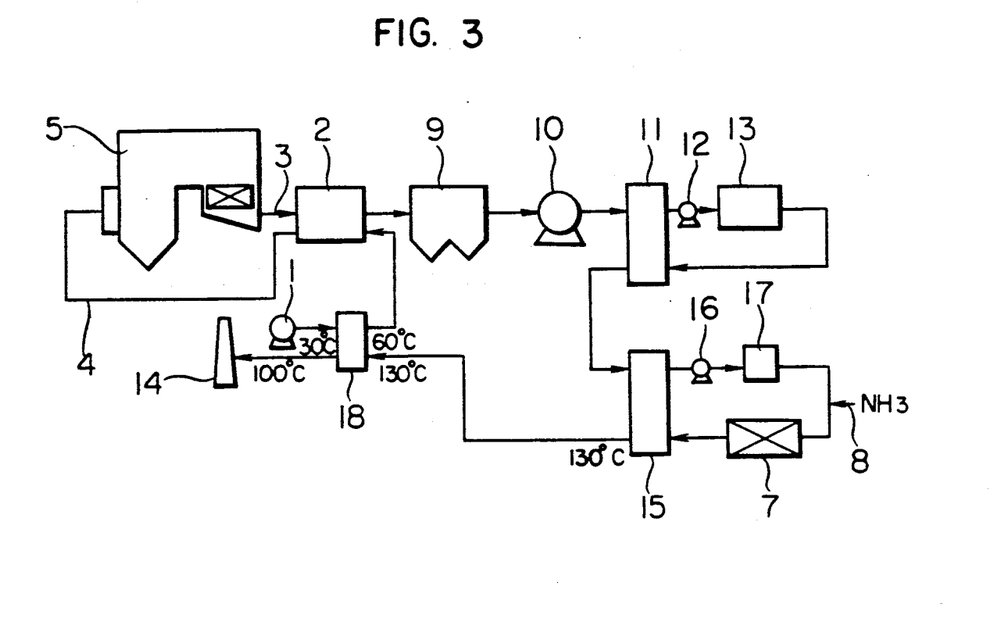
FIG. 3 is a schematic flowsheet of an apparatus for treating a flue gas according to another embodiment of the present invention.

A further embodiment of the present invention is shown in FIG. 3. In the apparatus for treating a flue gas shown in FIG. 3, the air heater 2 is provided to heat exchange the flue gas from the boiler 5 with combustion air, and the dust collector 9 is provided on the upstream side of the gas-gas heater 11. The gas-gas heater 15 is provided at the outlet of the apparatus for removing NOx 7, and the flue gas from the gas-gas heater 15 is passed through an air heater 18 to recover the heat.

In FIG. 3, the combustion air heated by heat exchange with the flue gas in the air heater 18 is further heated in the air heater 2 and led to the boiler as combustion air. The flue gas produced by combustion in the boiler 5 passes through the flue gas duct 3 to the air heater 2, dust collector 9, and fan 12 to the apparatus for removing SOx, and then to the gas-gas heater 11, cooled therein, and then subjected to SOx removal in the apparatus for removing SOx 13. The apparatus 13 is based, for example, on wet process. The treated flue gas from the apparatus 13 is heated in the gas-gas heater 11 through heat exchange, further heated in the gas-gas heater 15 and led to the heater 17. The flue gas heated in the heater 17 is admixed with NH injected from the NH injection tube 8, treated in the apparatus for removing NOx 7, cooled in the gas-gas heater 15 (for example, to 130° C.), further cooled in the air heater 18 through heat exchange with the combustion air (for example, to 100° C.), and discharged from the stack 14. The combustion air from the forced draft fan 1 is heated, for example, from 30° C. to 60° C. in the air heater 18. It is desirable that the temperature increase range in the air heater 18 is the same as that in the conventional steam air preheater, but when the temperature increase range is too large, the capacity of dust collector 9 etc. provided on the downstream side of the air heater 2 will be increased. This is a disadvantage.

At the start-up of the boiler 5, heat recovery by the air heater 18 cannot be carried out. This is not particularly a problem, as at the startup of the boiler in the prior art. At a low load, the flue gas temperature at the outlet of boiler 5 is lowered, and thus the flue gas temperature on the downstream side of boiler 5 is also lowered. Consequently, the temperature of flue gas introduced in the air heater 18 is lowered, and thus the temperature of combustion air to the boiler 5 is also lowered. In this case, the amount of fuel to the boiler 5 is supplemented only by the amount of fuel corresponding to the temperature difference from the lowered temperature.

In the foregoing embodiment, the waste heat of flue gas so far discarded can be effectively utilized, and thus the fuel cost of the entire plant can be reduced. That is, as shown in FIG. 3, the temperature of gas discharged from the stack 14 is about 130° C. in the prior art, and the temperature of flue gas at the outlet of gas-gas heater 11, the flue gas being to be led to the gas-gas heater 15, is usually about 100° C. Thus, even if the heat exchange efficiency of gas-gas heater 15 is made as high as possible, the flue gas from the gas-gas heater 15 cannot be made lower than about 130° C. It is seen from this fact that the flue gas is made wastefully higher by 30° C. by heating in the heater 17. If the flue gas from the gas-gas heater 15 can be discharged at 100° C. from the stack 14, the heat can be completely recovered.

In the present invention, the flue gas is led to the air heater 18 and heat exchanged with the combustion air at about 30° C. from the forced draft fan 1, whereby the waste heat so far discarded uselessly can be recovered in the air heater 18.

In the prior art, the air heater 18 is a steam heater to maintain the temperature in the low temperature part of the air heater 2 so that the corrosive gas of sulfuric acid, etc. may not condense in that part. To this end, the average outlet temperature is maintained at about 60° C. When the flue gas temperature at the outlet of stack 14 is maintained at 100° C by the air heater 18, the air temperature at the outlet of the air heater 18 will be about 60° C. by calculation, and thus it is not necessary to preheat the air by steam heater, as in the prior art, and the amount of fuel for the boiler 5 can be reduced. In some case, the preheating by steam can be auxiliarily used, but the amount of steam is considerably smaller than that in the prior art.

In case of heat exchange of combustion air with a flue gas containing sulfur components from the boiler 5, etc., it is necessary to maintain the low temperature part of the air heater 2 above the dew point of the corrosive gas, as described above. The air heater 18 of the foregoing embodiment is to heat exchange the combustion air with clean gas freed from SOx, and thus there is no problem of low temperature corrosion even with a low temperature air.

When the embodiment of FIG. 3 is applied to a coal-fired actual boiler plant having a 250,000 KW capacity and a flue gas capacity of 750,000 Nm$^3$/hr to calculate the reduction in the boiler fuel cost, about 1% of the total heat consumed in the boiler 5 can be supplied by the air heater 18. In other words, about 1% of fuel cost can be reduced. In the actual boiler plant consuming 100 tons/hr of coal, the reduction by about 1% is effectively remarkable.

Figure 4:
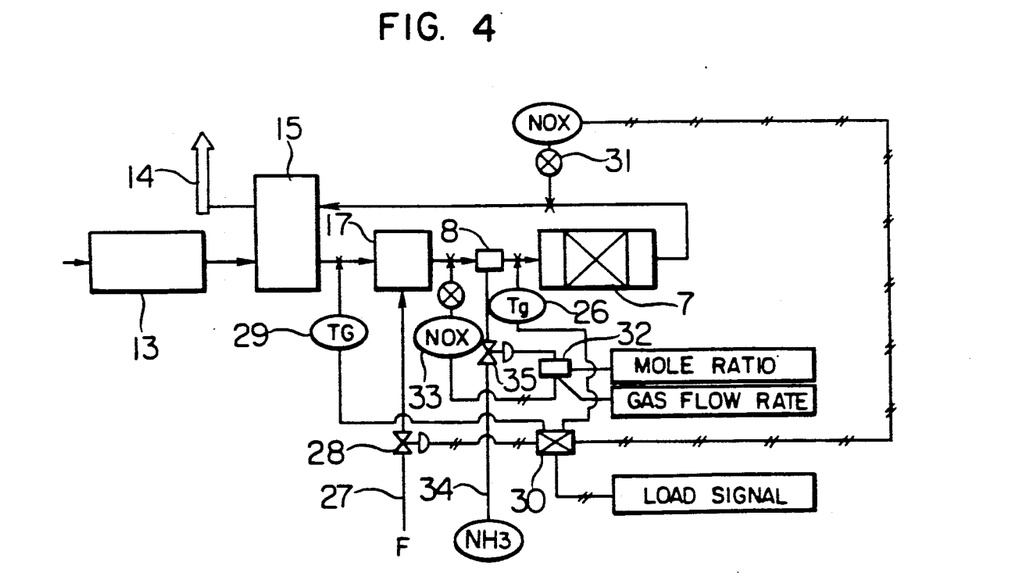
FIG. 4 is a flowsheet of control system of an apparatus for treating a flue gas according to a further embodiment of the present invention.

FIG. 4 shows a flowsheet of fuel control in the After-DeNOx system. In carrying out a dry process for removing NOx from a flue gas, the catalyst activity can be maintained high when the flue gas temperature is at 350° to 400° C. in the apparatus for treating a flue gas based on the After-Economizer System, and effective NOx removal can be carried out in a smaller catalyst amount. However, it is not always simple to maintain the gas temperature at the inlet of the apparatus for removing NOx 7 in the said temperature range in the plant, and particularly, in the apparatus for treating a flue gas according to the After-DeNOx system, where an apparatus for removing SOx 13 is provided on the upstream side of the apparatus for removing NOx 7, the flue gas temperature is widely lowered to 40° to 100° C.

In this embodiment shown in FIG. 4, a gas temperature meter 29 provided on the upstream side of the heater 17 and a gas temperature meter 26 provided on the downstream side of the NH$_3$ injection pipe 8 are connected to a control box 30 conducting memory and issuing instruction signals to form a signal circuit. Likewise, an outlet NOx meter 31 is provided at the outlet of the apparatus for removing NOx 7, and is also connected to the control box 30. On the other hand, a valve 28 provided in a fuel line 27 for supplying fuel F to the heater 17 is actuated by an instruction signal from the control box 30 to form a circuit between the valve 28 and the control box 30.

Numeral 32 is an auxiliary control box which receives a detection signal from an NOx concentration meter 33 provided on the upstream side of the NH injection pipe 8 and actuates an NH$_3$ control valve 35 in a NH$_3$ supply line 34 on the basis of an NH$_3$ mole ratio and a flue gas flow rate. The auxiliary control box 32 may be incorporated in the control box 30.

In the apparatus of said structure, the flue gas heated in the heater 17 is mixed with NH$_3$ injected through the NH$_3$ injection pipe 8, subjected to NOx removal in the apparatus for removing NOx 7, led to the gas-gas heater 15 through the outlet duct to recover the heat, and discharged from the stack 14. Fuel F to be supplied to the heater 17 is subjected to flow rate control by the valve 28, where the flow rate to be controlled is set on the basis of calculation result in the control box 30 so that the outlet gas condition (NOx removal efficiency or NOx concentration) from the apparatus for removing NOx may be maintained at the desired value by the signal from the NOx concentration meter 31 at the outlet of the apparatus for removing NOx 7. The injected NH$_3$ mole ratio is usually in constant control, and the rate of NH$_3$ to be injected can be controlled by determining the absolute value of NOx to the apparatus for removing NOx 7 from a signal of the NOx concentration meter 33 at the outlet of the heater 17 and a signal of the gas flow rate, and setting the necessary injection mole ratio on the basis of the determined absolute value of NOx. In this case, as a means for enhancing the response speed the outlet temperature of flue gas at the gas-gas heater 15 is measured by the outlet gas temperature meter 29 and the outlet temperature at the heater 17 by a temperature meter (not disclosed in the drawing), and a provisional increase in fuel F is made on the basis of these temperatures together with the load signal to make preceding control.

In case of operation according to the DDS schedule, or a rapid load fluctuation by the operation according to the DDS schedule, the delay in the catalyst temperature increase against the gas temperature increase may lower the NOx-removing capacity for a while. In this case, the injected NH$_3$ mole ratio must be increased by the amount corresponding to the reduction in capacity to prevent the capacity from the consequent reduction.

Figure 5:
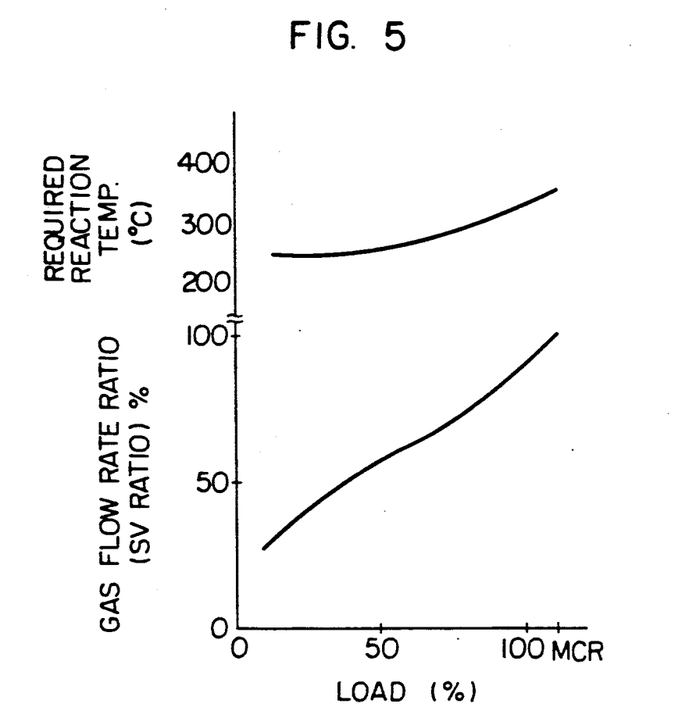
FIG. 5 is a characteristics diagram showing the relationship between the load and the ratio of treated gas flow rate (SV ratio) and the required reaction temperature for making the outlet NOx at a constant concentration.

FIG. 5 shows relationship between the change in the load of an apparatus for treating a flue gas and a ratio of treated gas flow rate [to that of maximum continuous rating (MCR) operation], and relationship between the change in the load and the required reaction temperature (gas temperature) for maintaining the outlet NOx concentration constant against the constant inlet NOx concentration to the apparatus for removing NOx 7, i.e. for making the NOx removal efficiency constant. As is obvious from this diagram, the required reaction temperature is lowered in accordance to a decrease in the gas flow rate, and the heat required for the heater 17 can be reduced correspondingly. In the apparatus of FIG. 1 the fuel supply rate to the heater 17 is adjusted on the basis of these relationships to prevent the fuel F from unnecessitated consumption. The diagram of FIG. 5 is based on such a case that the inlet NOx concentration is 300 ppm, the NOx removal efficiency is 80%, and the leaked NH$_3$ is 5 ppm.

Figure 6:
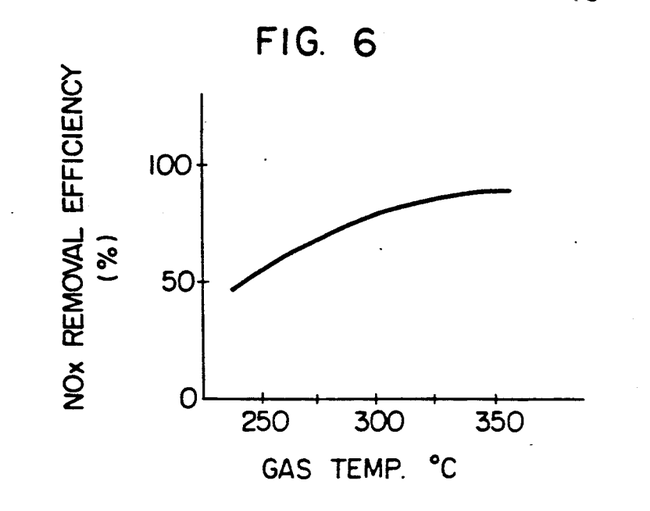
FIG. 6 is a characteristics diagram showing the temperature characteristics of a catalyst.

FIG. 6 shows relationship between the gas temperature and the NOx removal efficiency, where the NOx removal efficiency is lowered with decreasing gas temperature, and the catalyst activity is also lowered in accordance to a decrease in the gas temperature, but the heating fuel F is largely saved thereby. The increased amount of NH$_3$ to be injected can be offset by the saving of heating fuel.

Figure 7:
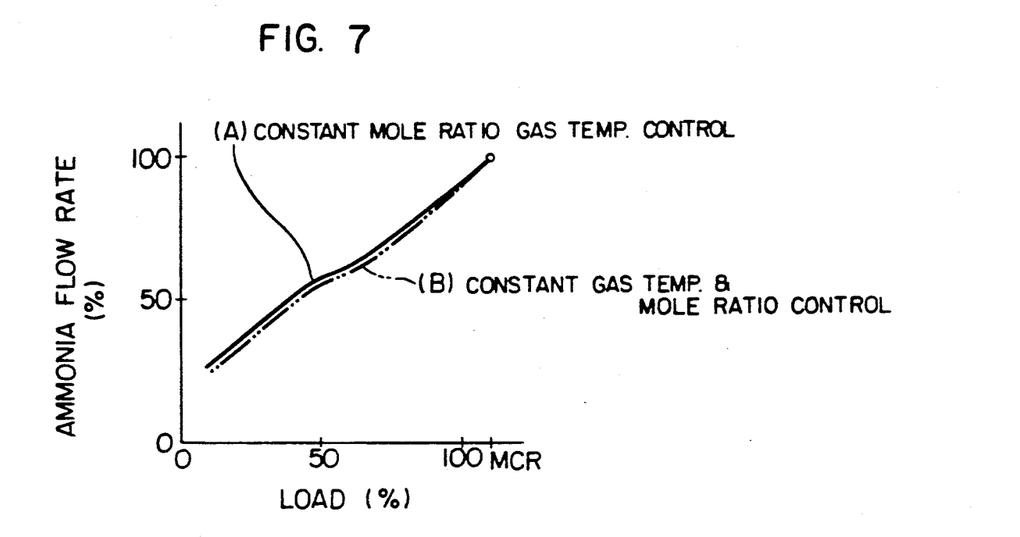
FIG. 7 is a characteristics diagram showing the relationship between the load and the necessary ammonia flow rate.

FIG. 7 shows relationship between the load and the ammonia (NH$_3$) flow rate in the control method (A) of the present apparatus for controlling the gas temperature in a constant mole ratio and the conventional control method (B) for controlling a mole ratio at a constant gas temperature. The NH$_3$ flow rate in the present control method is a little higher on the whole, but the difference is about 11%, and can be substantially disregarded.

Figure 8:
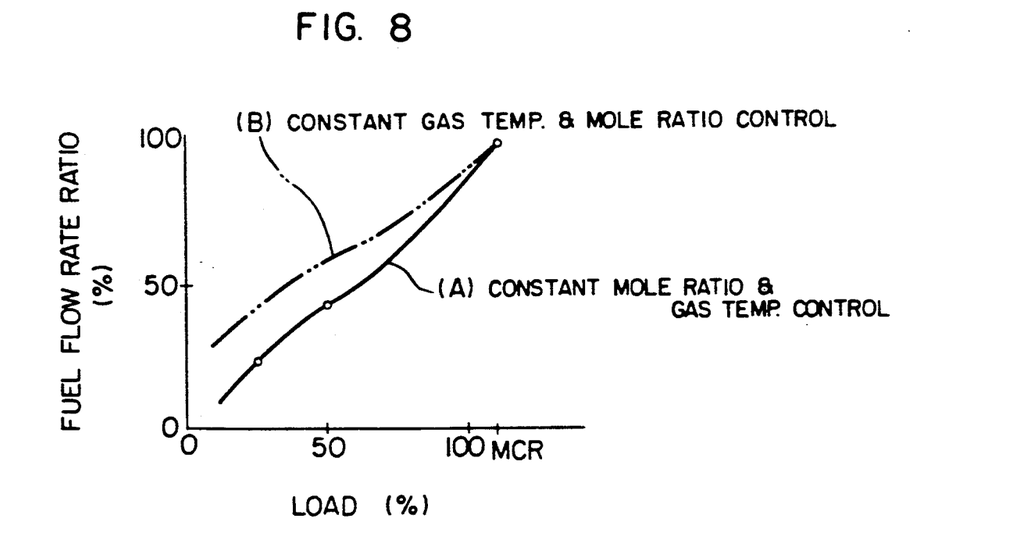
FIG. 8 is a characteristics diagram showing relationships between the load and the necessary fuel flow rate.

FIG. 8 shows relationship between the load and the fuel flow rate ratio [to that of maximum continuous rating (MMCR)] to the heater 17, and the present control method (A) can reduce the fuel flow rate considerably in the entire load range and particularly its effect is remarkable in the low load range, as compared with the conventional control method (B).

Figure 9:
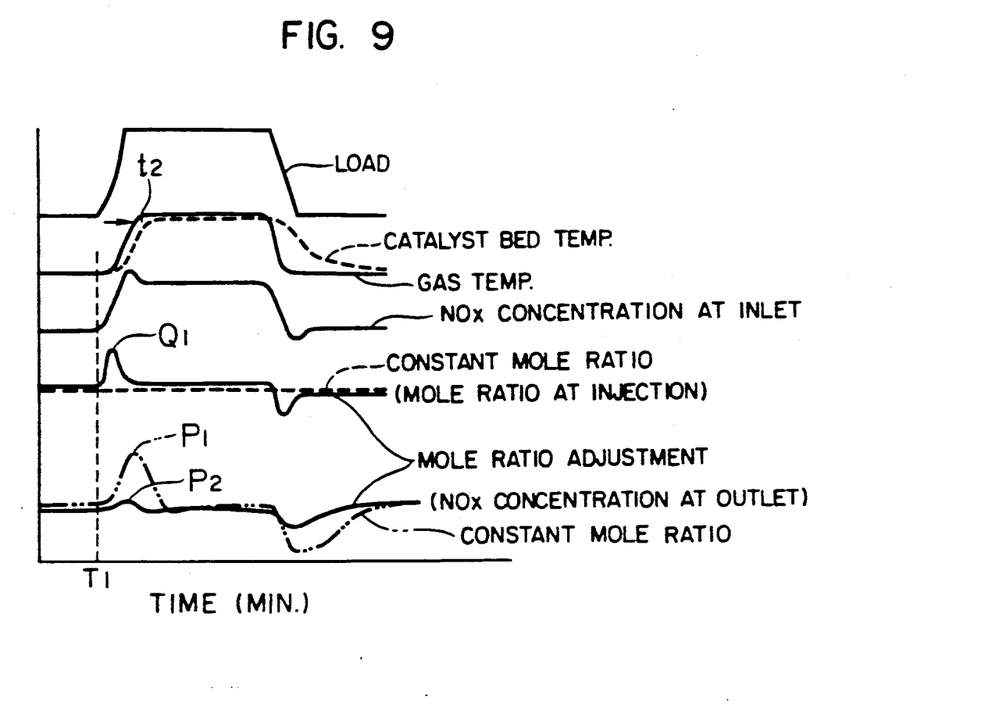
FIG. 9 is a characteristic diagram showing changes in gas temperatures at the inlet and the outlet of a reactor and the behavior of outlet NOx concentration, combined with mole ratio adjustment when a load is rapidly increased.

In FIG. 9, when the load is suddenly increased at time T$_1$, the gas temperature increases substantially in accordance to the gas temperature, whereas an increase in the catalyst bed temperature has a time lag t$_2$, because the catalyst has a definite specific heat. Thus, the catalyst activity is lowered for a while, if the mole ratio is kept constant, and the NOx concentration at the outlet of the apparatus for removing NOx will be increased to P$_1$. In such a sudden increase in the load, the degree of opening of NH$_3$ control valve 35 is increased to increase the injected NH$_3$ mole ratio for a while as given by Q$_1$ and to prevent the NOx concentration from increasing, as given by P$_2$. These controls can be carried out in a very short time in the auxiliary control box 30 in FIG. 4, so that no time lag may occur in the control.

As shown in this embodiment, the consumption of expensive fuel for heating the flue gas can be considerably reduced, while maintaining a high NOx removal efficiency, and thus the present invention is very economical.

Figure 10:
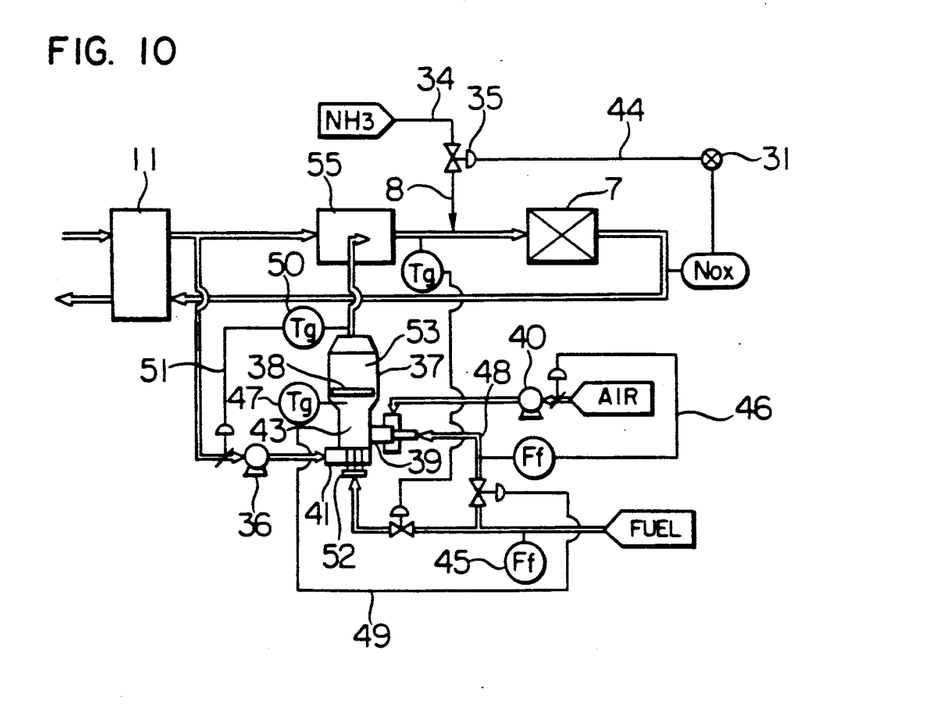
FIG. 10 is a schematic flowsheet showing a heater in an apparatus for treating a flue gas according to a further embodiment of the present invention.

FIG. 10 shows a flowsheet of an apparatus for removing NOx according to a reheating system. A flue gas passes through a gas-gas heater 11, where the flue gas is heated to about 250° to about 300° C. through heat exchange with the treated gas after the NOx removal. A portion of the heated flue gas is by-passed by a fan 36 by suction and led to a front burner 37, where a catalyst burner (combusting catalyst) 38 is provided as a means for catalytic combustion. The by-passed untreated flue gas is mixed with fuel, for example, gaseous fuel or liquid fuel, preferably kerosene, and the mixture is made to pass the catalyst burner 38 to make combustion. In the catalyst burner 38, thorough ignition and combustion can be carried out even at an O$_2$ concentration of about 5 to about 6% in an inflow gas by adjusting the mixture of fuel and flue gas as the inflow gas to 250° to 350° C.

Figure 11:
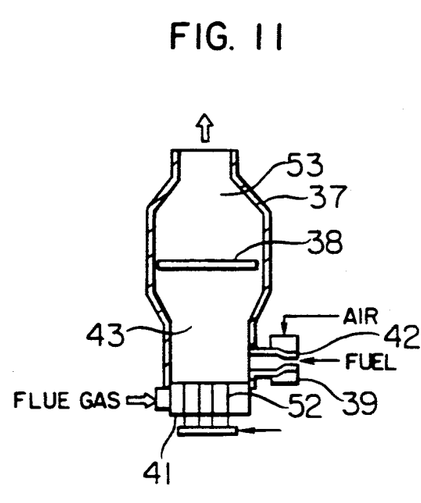
FIG. 11 is a detailed cross-sectional view of a front burner used in the embodiment of FIG. 10.

In the foregoing embodiment, when the inflow gas is below the ignition temperature at the start-up, etc. an auxiliary burner 39 is used to increase the temperature above the ignition temperature. Combustion air for the auxiliary burner 39 can be supplied by an induced draft fan 40, and the amount of combustion air can be 10 to 15% of the total amount of fuel. As shown in detail in FIG. 11, a portion of fuel is preheated with a flue gas in a gas chamber 41, and supplied to the bottom of a front burner 37 through fuel nozzles 52, where other portion of the fuel is supplied to a premixing chamber 43 from a burner nozzle 42 of the auxiliary burner 39 through a branch line.

In FIG. 10, a line 44 for detecting an NOx concentration at the outlet of the apparatus for removing NOx by an outlet NOx meter 31 and controlling the flow rate of ammonia to be supplied from the NH$_3$ injection pipe 8 correspondingly, a line 46 for detecting a flow rate of fuel to be supplied to the auxiliary burner 39 by a fuel flow rate meter (Ff) 45 and controlling the flow rate of air to be supplied to the auxiliary burner 39 correspondingly, a line 49 for detecting a temperature at the inlet of catalytic burner (catalyst bed) 38 in the front burner 37 by an inlet temperature detector 47 and controlling the flow rate of fuel in a fuel branch line 48 so that the temperature may be higher than a given value, and a line 51 for detecting an outlet gas temperature of the front burner 37 by an outlet temperature detector 50 and controlling a flow rate of flue gas to be supplied to the front burner 37 so that the temperature may fall within a given range are provided. With this structure, the combustion gas temperature in the catalytic burner 38 reaches about 800° to about 900° C. because of a gas of low calorific value of about 2,000 kcal/Nm$^3$ being obtained by mixing with the flue gas and combustion in a low $O_2$ concentration zone, and is also suitable for the conditions of the catalytic burner 38, and the capacity of combustion chamber 53 can be reduced thereby.

In the present invention, the shape and arrangement of catalytic burner 38 itself are not particularly restricted, but the height of the catalyst bed in the catalytic burner 38 is preferably about 150 to about 200 mm, and the pressure drop can be kept to as low as about 40 to about 60 mm $H_2O$ in such a range of catalyst bed height. Preferable catalyst burner 38 is, for example, an oxidation catalyst such as palladium, etc. supported on an alumina carrier, but is not restricted thereto.

The flue gas from the front burner 37 is mixed with the flue gas in a gas mixer 55, adjusted to a suitable temperature for the reaction in the apparatus for removing NOx 7, admixed with ammonia from the ammonia injection tube 8, subjected to the NOx removal reaction in the apparatus for removing NOx 7, and discharged to the outside of the apparatus after preheating the flue gas in the gas-gas heater 11, as described above.

Figure 12:
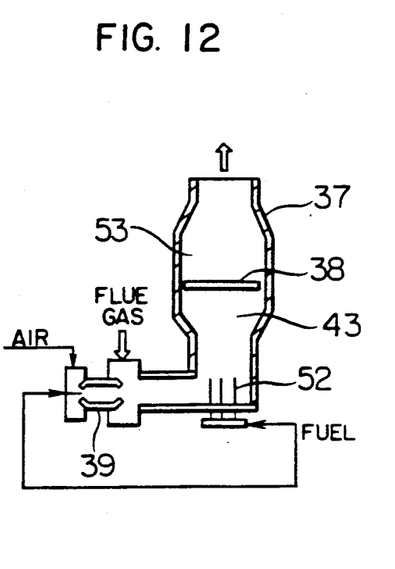
FIG. 12 is a cross-sectional view of another embodiment of a front burner used in the present invention.

FIG. 12 shows a cross-sectional view of another embodiment of the front burner for use in the present invention, where an auxiliary burner 39 is provided in the flue gas supply part, and after combustion of a portion of fuel in the auxiliary burner 39 under the supply of combustion air, when required at the start-up, etc., the combustion gas is mixed with the flue gas, and the mixture is supplied to a premixing chamber 43 of the front burner 37, where the mixture is mixed with the main fuel from a fuel nozzle 52, and the mixture is supplied to the catalytic burner 38.

In this embodiment, the flue gas supply part and the auxiliary burner 39 are integrated, and the heat efficiency is more improved.

Figure 13:
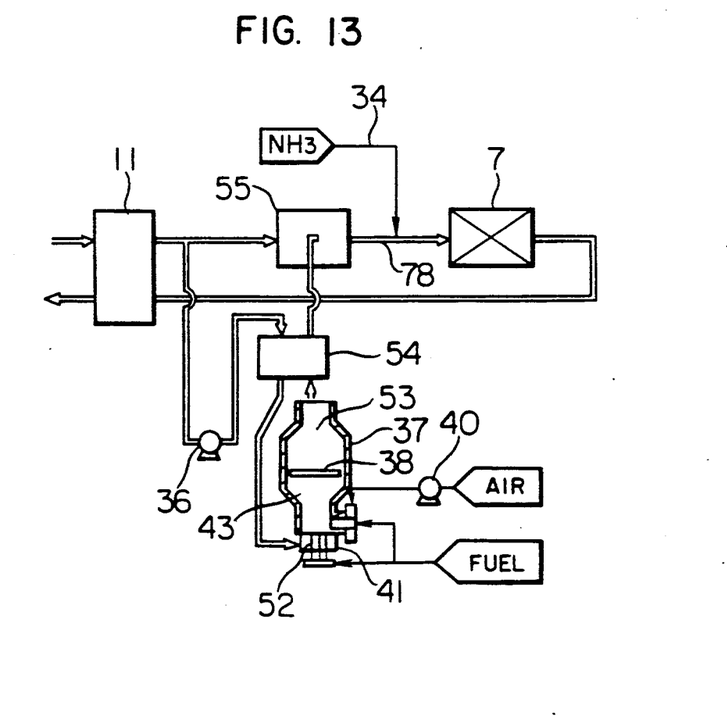
FIG. 13 is a schematic flowsheet of a heater in an apparatus for treating a flue gas according to a further embodiment of the present invention.

FIG. 13 is a flowsheet of an apparatus for removing NOx according to a further embodiment of the present invention, where the difference from that of FIG. 10 is such that the gas-gas heater 54 is provided at the outlet of the front burner 37 to heat exchange the flue gas supplied by a fan 36 with the hot gas discharged from the front burner 37 and to elevate the temperature of flue gas to be supplied to the front burner to a desired one. By heat exchanging the combustion gas from the front burner 37 with the flue gas in the gas-gas heater 54, the apparatus can be efficiently operated.

One example of comparing the mass balance in the present apparatus with that of the prior art is shown below.

About $1.2 \times 10^6$ Nm$^3$/hr of the flue gas discharged from an apparatus for removing SOx by wet process for 350 MW boiler output capacity is heated to 350° C., and subjected to NOx removal. The mass balance is shown in comparison in the following Table.

As shown in the foregoing Table, combustion at a low oxygen concentration can be made possible in the present invention, and the flow rate of combustion air for the auxiliary combustion can be reduced. Thus, the flow rate of the combustion flue gas can be reduced and also the flow rate of fuel for the auxiliary combustion can be reduced. From the apparatus viewpoint, the flow burner can be made smaller in the size. Owing to the combustion at a low oxygen concentration, the NOx concentration in the flue gas can be reduced, and also the amount of catalyst necessary for the apparatus for removing NOx can be reduced.

By combusting the fuel in the front burner in the presence of a catalyst by effectively utilizing the $O_2$ contained in the flue gas, the reduction in the flow rate of the auxiliary fuel and the flow rate of combustion air for the auxiliary combustion (making the size of a forced draft fan smaller) and suppression of an increase in the flow rate of combustion flue gas and in the NOx concentration during the auxiliary combustion can be attained. Furthermore, by the reduction in the catalyst amount of the apparatus for removing NOx according to the After-DeNox System and utility, and by smaller size of the facility, the present invention can provide an economical apparatus for treating a flue gas.

The following effects can be obtained in the present invention:

(1) With smaller heat loss in the entire apparatus for treating a flue gas including a boiler, economical operation can be made possible.

(2) The air leaked from the air heater is directly discharged into the atmosphere from the stack, and thus the capacity of the apparatus for treating a flue gas is not increased, but, to the contrary, can be made more compact with reduction in the power of fan, etc.

(3) Only two heat exchangers are needed, and the apparatus can be simplified. The temperature difference in the heat exchanger can be made larger, and thus a smaller heat transmission area is satisfactory for the exchange of the same heat quantity.

(4) The flue gas to the air heater is a clean flue gas free from NOx and SOx and also from dusts, and thus there are no problems of corrosion, clogging, etc. in the air heater.

The present invention is more suitable for supplementing the existing boiler plant with an apparatus for removing NOx, and an increase in the fuel cost for reheating, which is the largest drawback in the NOx removal of the gas after the SOx removal, can be suppressed, and an economical and highly reliable apparatus for treating a flue gas can be provided in the present invention.

What is claimed is:

1. An apparatus for removing nitrogen oxides from a low temperature flue gas flowing through said apparatus, which flue gas contains NO$_x$ and residual O$_2$ which comprises:

a source of low temperature flue gas;

NO$_x$ removal means for removing nitrogen oxides from flue gas;

a main flue gas passage operably connecting said source of low temperature flue gas with said NO$_x$ removal means, said main flue gas passage allowing at least a first portion of flue gas from said source of said low temperature flue gas to pass to said NO$_x$ removal means;

heating means for forming a heated flue gas;

said main flue gas passage being provided with, in series, withdrawal means connected to said main flue gas passage for withdrawing a second portion of flue gas in said main flue gas passage, gas mixing means for mixing the heated flue gas with the first portion of flue gas in said main flue gas passage to form a mixed flue gas, and injection means for injecting an $NO_x$ removal agent into said mixed flue gas in said main flue gas passage, said withdrawal means being provided between said source of low temperature flue gas and said gas mixing means, and said injection means being provided between said gas mixing means and said $NO_x$ removal means;

an auxiliary flue gas passage for removing said second portion of flue gas from said main flue gas passage, heating the second portion of flue gas removed in the auxiliary flue gas passage and then returning the flue gas removed in the auxiliary flue gas passage to said main flue gas passage, said auxiliary flue gas passage removing the second portion of flue gas from said main flue gas passage at said withdrawal means, passing the removed second portion of flue gas to said heating means and then passing the second portion of flue gas from the heating means to said gas mixing means so as to recombine the second portion of flue gas with the flue gas in the main flue gas passage;

said heating means being operably connected between said withdrawal means and said gas mixing means, said heating means comprising an auxiliary burner means for burning heating fuel and air and a front burner provided with inlet mixing means for mixing heating fuel with the second portion of flue gas to thereby form a fuel gas mixture, and catalytic combustion means for combusting the fuel gas mixture;

auxiliary heating fuel flow rate control means for controlling a flow rate of heating fuel to said auxiliary burner means in accordance with a temperature of combustion gas between said auxiliary burner means and said catalytic combustion means, and an air flow rate control means for controlling a flow rate of air to said auxiliary burner means in accordance with a detected flow rate of heating fuel to said auxiliary burner means; and control circuit means for setting a flue gas temperature of flue gas passing to said $NO_x$ removal means for maintaining a desired percent $NO_x$ removal in accordance with a load and for controlling a flow rate to the heating fuel to said front burner to thereby keep the desired flue gas temperature;

wherein said control circuit means comprises a flow rate control means for controlling a flow rate of the second portion of flue gas in accordance with a temperature of the heated flue gas between said heating means and said gas mixing means.

2. An apparatus according to claim 1, wherein said control circuit means further comprises a heating fuel flow rate control means for controlling a flow rate of the heating fuel to said front burner in accordance with a temperature of flue gas in said main flue gas line between said gas mixing means and said injection means.

3. An apparatus according to claim 1, wherein said auxiliary burner means is provided between said inlet mixing means and said catalytic combustion means.

4. An apparatus according to claim 1, wherein said auxiliary burner means is provided at the inlet mixing means of said heating means.

5. An apparatus according to claim 1, further comprising a gas-gas heater for heat exchanging the second portion of flue gas between said withdrawal means and said heating means with the heated flue gas from said heating means.

6. An apparatus according to claim 1, wherein said source of low temperature flue gas is a SOx removal means for removing sulfur oxides from flue gas.

* * * * *